United States Patent
Muta et al.

(10) Patent No.: US 9,434,371 B2
(45) Date of Patent: Sep. 6, 2016

(54) CONTROL DEVICE OF HYBRID VEHICLE

(75) Inventors: Koichiro Muta, Okazaki (JP); Michio Nakamura, Toyoake (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 480 days.

(21) Appl. No.: 13/617,592

(22) Filed: Sep. 14, 2012

(65) Prior Publication Data

US 2013/0079965 A1   Mar. 28, 2013

(30) Foreign Application Priority Data

Sep. 22, 2011   (JP) .................................. 2011-208163

(51) Int. Cl.
| | |
|---|---|
| B60W 20/00 | (2016.01) |
| B60W 10/06 | (2006.01) |
| B60W 10/08 | (2006.01) |
| B60K 6/445 | (2007.10) |
| B60W 30/18 | (2012.01) |
| B60W 30/188 | (2012.01) |

(52) U.S. Cl.
CPC .............. *B60W 10/06* (2013.01); *B60K 6/445* (2013.01); *B60W 10/08* (2013.01); *B60W 20/17* (2016.01); *B60W 30/18054* (2013.01); *B60W 30/1882* (2013.01); *B60W 2510/188* (2013.01); *B60W 2710/083* (2013.01); *Y02T 10/6239* (2013.01); *Y02T 10/6286* (2013.01)

(58) Field of Classification Search
CPC ..... B60K 6/445; B60W 10/08; B60W 20/00; B60W 10/06; Y02T 10/6239; Y02T 10/6286
USPC .............................. 701/101; 475/5; 180/65.4
See application file for complete search history.

(56) References Cited

U.S. PATENT DOCUMENTS

| | | | | |
|---|---|---|---|---|
| 8,209,103 | B2 * | 6/2012 | Oyama et al. | ................. 701/101 |
| 8,277,350 | B2 * | 10/2012 | Ai et al. | ............................. 475/5 |
| 2002/0117339 | A1 * | 8/2002 | Nakashima | .................. 180/65.4 |
| 2009/0088913 | A1 * | 4/2009 | Oyama et al. | .................. 701/22 |

FOREIGN PATENT DOCUMENTS

| | | |
|---|---|---|
| JP | 2004254434 A | 9/2004 |
| JP | 2007-022296 A | 2/2007 |
| JP | 2010-100145 A | 5/2010 |
| JP | 2010-163090 A | 7/2010 |
| JP | 2010-179856 A | 8/2010 |

* cited by examiner

*Primary Examiner* — Jerrah Edwards
*Assistant Examiner* — Aaron Smith
(74) *Attorney, Agent, or Firm* — Dinsmore & Shohl LLP

(57) ABSTRACT

An operation line is set on the basis of a shift position and a brake pedal position, from among a plurality of operation lines in which a degree of avoidance of an abnormal noise generation region from a fuel-economy optimal operation line becomes smaller as a degree to which travel of the vehicle is restricted becomes greater. An engine and a motor are controlled by setting a target operation point of the engine using the set operation line, and by setting a torque instruction of the motor.

6 Claims, 8 Drawing Sheets

| | | | |
|---|---|---|---|
| P POSITION | BRAKE ON | OPERATION LINE L1 | SMALL ↑ |
| | BRAKE OFF | OPERATION LINE L2 | AVOIDANCE DEGREE |
| D POSITION | BRAKE ON | OPERATION LINE L3 | ↓ |
| | BRAKE OFF | OPERATION LINE L4 | LARGE |

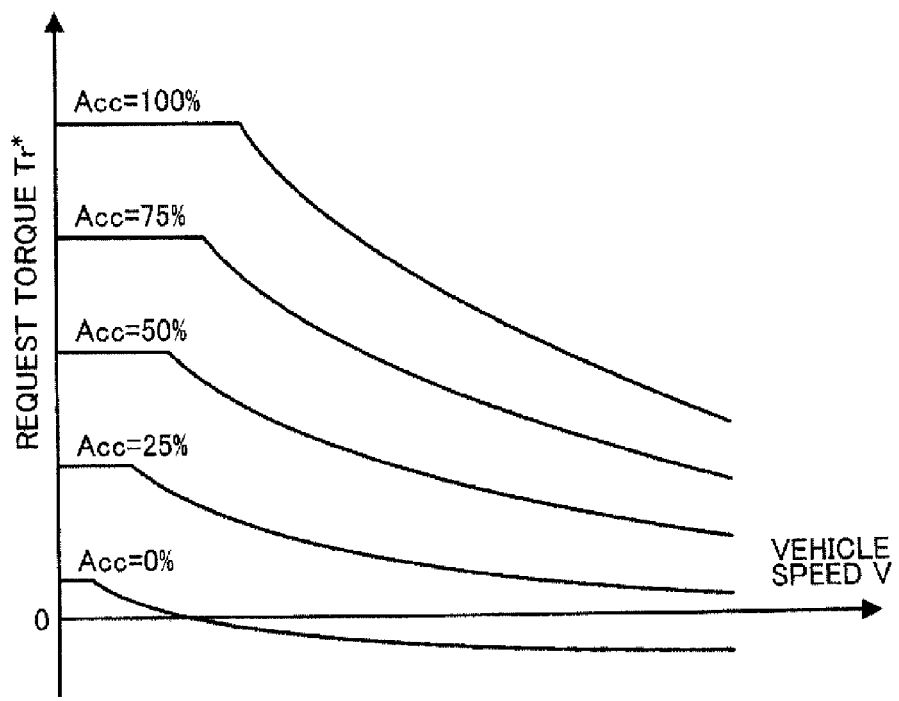

FIG. 10

| | | BRAKE ON | OPERATION LINE LP1 | SMALL |
|---|---|---|---|---|
| P POSITION | | BRAKE OFF | OPERATION LINE LP2 | ↑ |
| D POSITION | 1ST SPEED | BRAKE ON | OPERATION LINE LD1 | |
| | | BRAKE OFF | OPERATION LINE LD2 | |
| | 2ND SPEED | BRAKE ON | OPERATION LINE LD3 | AVOIDANCE DEGREE |
| | | BRAKE OFF | OPERATION LINE LD4 | |
| | 3RD SPEED | BRAKE ON | OPERATION LINE LD5 | |
| | | BRAKE OFF | OPERATION LINE LD6 | |
| | 4TH SPEED | BRAKE ON | OPERATION LINE LD7 | ↓ |
| | | BRAKE OFF | OPERATION LINE LD8 | LARGE |

CONTROL DEVICE OF HYBRID VEHICLE

CROSS REFERENCE TO RELATED APPLICATIONS

This application claims priority to Japanese Patent Application No. 2011-208163 filed on Sep. 22, 2011, which is incorporated herein by reference in its entirety including the specification, drawings and abstract.

INCORPORATION BY REFERENCE

The disclosure of Japanese Patent Application No. 2011-208163 filed on Sep. 22, 2011 including the specification, drawings and abstract is incorporated herein by reference in its entirety.

BACKGROUND OF THE INVENTION

1. Field of the Invention

The invention relates to a vehicle control device, and more particularly, to a control device of a hybrid vehicle that is provided with an internal combustion engine, a power generator capable of input and output of motive power, a planetary gear mechanism in which three rotational elements are connected to three shafts, namely a drive shaft that is coupled to an axle, an output shaft of the internal combustion engine and a rotating shaft of the power generator, and an electric motor that inputs and outputs motive power to/from the drive shaft.

2. Description of Related Art

Conventionally, as such control devices of hybrid vehicles provided with an engine, a motor generator, and a motive power splitting mechanism that is connected to an axle, an output shaft of an engine and a rotating shaft of a motor generator, control devices in which the engine revolutions at an engine operation point for avoiding a rattling noise are set to be higher as the proportion of exhaust gas recirculation (EGR rate) becomes greater have been proposed (for instance, Japanese Patent Application Publication No. 2010-179856 (JP-2010-179856 A)). In this device, the engine revolutions at the engine operation point are set to be higher as the EGR rate becomes greater; as a result, occurrence of rattling noise is suppressed.

Control devices of a hybrid vehicle configured similarly include devices wherein the operation of an engine is controlled by setting an operation line in which the higher the vehicle speed is, the greater the torque is at a low rpm region of the engine (for instance Japanese Patent Application Publication No. 2007-022296 (JP-2007-022296 A)). In this device, there is masked abnormal noise that may occur through operation of the engine at a low-rpm, high-torque region, in that the higher the vehicle speed is, the greater travel-derived noise becomes. Discomfort to the driver caused by abnormal noise is suppressed as a result of that masking. However, control device of the hybrid vehicle has room for improvement in terms of improving the fuel economy while avoiding the occurrence of abnormal noise.

SUMMARY OF THE INVENTION

Abnormal noise, such as a muffled sound or a rattling noise, arises through transmission, to a mechanical mechanism such as a gearbox or the like, of fluctuations in engine torque, which is a vibration source. This noise is deemed to be caused by gear rattle in a mechanical mechanism (for instance, between gears), such that the gear rattle sound is transmitted to the body by way of the mechanical mechanism, brakes, a parking brake and the like, and reaches the driver in the form of abnormal noise. Accordingly, the degree to which the abnormal noise reaches the driver depends on the state of the mechanical mechanism, the brakes and the parking brake. Therefore, it is possible to improve the fuel economy of a hybrid vehicle, while suppressing discomfort to the driver due to abnormal noise, by operating the engine taking into account the degree to which abnormal noise reaches the driver, in accordance with the state of such mechanical mechanism, brakes or parking brake.

The control device of a hybrid vehicle of the invention aims at improving the fuel economy of a hybrid vehicle while suppressing discomfort to the driver due to abnormal noise.

A control device of a hybrid vehicle according to one aspect of the invention is provided with: an internal combustion engine; a power generator capable of input and output of motive power; a planetary gear mechanism in which three rotational elements are connected to three shafts, namely a drive shaft that is coupled to an axle, an output shaft of the internal combustion engine, and a rotating shaft of the power generator; and an electric motor that inputs and outputs motive power to/from the drive shaft; and a control unit that operates the internal combustion engine using, from among a plurality of operation lines, an operation line in which a degree of avoidance tends to become smaller as a degree to which travel of the vehicle is restricted becomes greater; and that controls the internal combustion engine, the power generator and the electric motor in such a manner that the vehicle travels by a driving force as required for travel. The plurality of operation lines are obtained through stepwise avoidance of an abnormal noise generation region at which an abnormal noise is generated, from a fuel-economy optimal operation line that is established beforehand as an operation line in which fuel economy of the internal combustion engine is optimal.

In the control device of a hybrid vehicle according to one aspect of the invention, a plurality of operation lines are obtained through stepwise avoidance of an abnormal noise generation region at which an abnormal noise is generated, from a fuel-economy optimal operation line that is established beforehand as an operation line in which fuel economy of the internal combustion engine is optimal, and the internal combustion engine is operated using, from among the plurality of operation lines, an operation line in which the degree of avoidance tends to become smaller as the degree to which travel of the vehicle is restricted becomes greater. This feature is based on the notion according to which the greater the degree to which the travel of the vehicle is restricted, the smaller becomes the degree to which abnormal noise reaches the driver. By virtue of the above-described control, therefore, the fuel economy of the hybrid vehicle can be improved while suppressing discomfort to the driver due to abnormal noise. Herein, "degree to which the travel of the vehicle is restricted" includes conceptually the degree to which the travel of the vehicle is hindered and the degree of unsuitability for travel at a higher vehicle speed. For instance, the travel of the vehicle is hindered on account of parking lock by a parking brake, and on account of a braking operation by driver. In sequential shift (virtual shift), the further the shift position is on the low vehicle speed range, the more unsuitable the shift position becomes for travel at a high vehicle speed.

In the control device of a hybrid vehicle according to the above aspect of the invention, the control unit may perform control using an operation line in which the degree of avoidance of the abnormal noise generation region is smaller when a parking lock is on than when the parking lock is off, or may perform control using an operation line in which the degree of avoidance of the abnormal noise generation region is smaller when a brake is on than when the brake is off. That is because the degree to which the travel of the vehicle is restricted, i.e. the degree to which the travel of the vehicle is hindered, is greater when the parking lock is on than when the parking lock is off; likewise, the degree to which the travel of the vehicle is restricted is greater when the brake is on than the where brake is off.

In the control device of a hybrid vehicle according to the above aspect of the invention, the control unit may perform control using an operation line in which the degree of avoidance of the abnormal noise generation region is smaller at a shift position for a low vehicle speed range than at a shift position for a high vehicle speed range. That is because it is found that the degree to which the travel of the vehicle is restricted becomes greater and the degree of unsuitability for travel at a high vehicle speed becomes greater as the shift position is further on the low vehicle speed range, as compared with the position on the high vehicle speed range.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is an explanatory diagram illustrating an example of a map for request torque setting:

FIG. 4 is an explanatory diagram illustrating a example of the relationship between a shift position SP, a brake pedal position BP and an operation line L;

FIG. 10 is an explanatory diagram illustrating an example of the relationship between a shift position SP, a shift stage of an automatic transmission 98, a brake pedal position BP and an operation line L.

DETAILED DESCRIPTION OF EMBODIMENTS

Embodiments for carrying out the invention are explained next.

Figure 1:
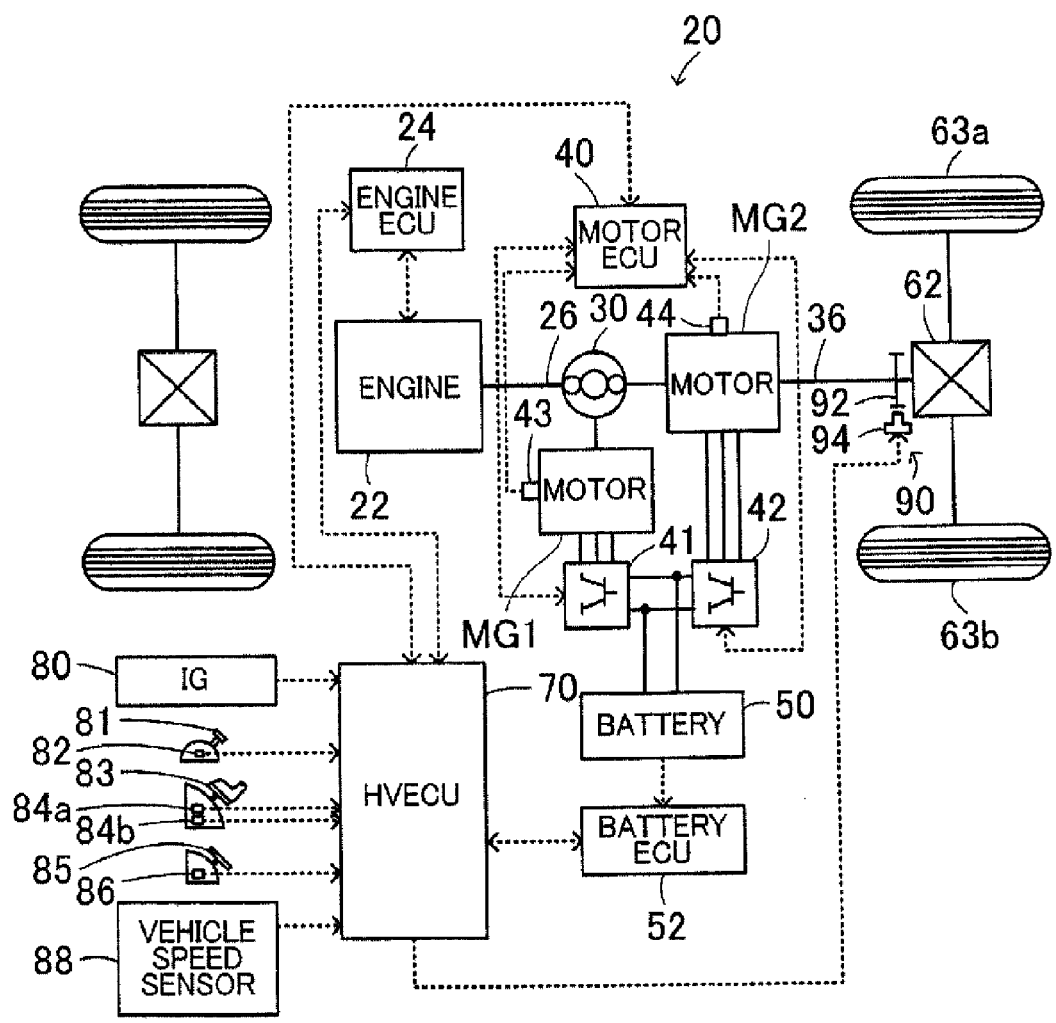
FIG. 1 is a configuration diagram illustrating schematically the configuration of a hybrid automobile 20 that is equipped with a control device of a vehicle of a first embodiment of the invention.

FIG. 1 is a configuration diagram illustrating schematically the configuration of a hybrid automobile 20 that is equipped with a control device of a vehicle of a first embodiment of the invention. As illustrated in the figure, a hybrid automobile 20 of the first embodiment is provided with: an engine 22 that is configured in the form of an internal combustion engine that outputs motive power from a hydrocarbon-based fuel, for instance gasoline or diesel oil; a three-axle-type power distribution and integration mechanism 30 that is made up of a planetary gear mechanism in which a carrier having a plurality of pinion gears coupled thereto is connected, via a damper 28, to a crankshaft 26, as an output shaft of the engine 22, and wherein a ring gear is connected to a drive shaft 36 that is coupled, via a differential gear 62, to drive wheels 63a, 63b; a motor MG1, being configured in the form of, for instance, a conventional synchronous generator-motor and having a rotor thereof connected to the sun gear of the power distribution and integration mechanism 30; a motor MG2, being configured in the form of, for instance, a conventional synchronous generator-motor and having a rotor thereof connected to the drive shaft 36; inverters 41, 42 for driving the motors MG1, MG2; a battery 50 configured in the form of, for instance, a lithium ion secondary battery, that exchanges electric power with the motors MG1, MG2 via the inverters 41, 42; a parking lock mechanism 90 mounted to the drive shaft 36; and an HV ECU 70 that controls the entire vehicle.

The operation of the engine 22 is controlled, in terms, for instance, of regulation control of intake air amount, fuel injection control, ignition control and the like, by an electronic control unit for the engine (hereafter, engine ECU) 24. The engine ECU 24 receives the input of signals from various sensors that detect the operating state of the engine 22, for instance the input of a crank position from a crank position sensor, not shown, that detects the crank angle of the crankshaft 26 of the engine 22. The engine ECU 24 outputs various control signals for operation control of the engine 22, for instance a driving control signal to throttle valves, fuel injection valves, spark plugs and a variable valve timing mechanism. The engine ECU 24, which communicates with the HV ECU 70, controls the operation of the engine 22 on the basis of a control signal from the HV ECU 70, and as the case may require, outputs, to the HV ECU 70, data relating to the operating state of the engine 22. The engine ECU 24 computes the revolutions of the crankshaft 26, i.e. revolutions Ne of the engine 22, on the basis of the crank position from the crank position sensor not shown.

An electronic control unit for the motors (hereafter, motor ECU) 40 performs driving control of both motors MG1, MG2. Signals that are necessary for driving control of the motors MG1, MG2 are inputted to the motor ECU 40. The motor ECU 40 outputs a switching control signal to the inverters 41, 42. Herein, the signals necessary for driving control of the motors MG1, MG2 are, for instance, signals from rotation position detection sensor 43, 44 that detect the rotation position of the rotors of the motors MG1, MG2, or the phase current that is applied to the motors MG1, MG2 and that is detected by a current sensor not shown. The motor ECU 40, which communicates with the HV ECU 70, performs driving control of the motors MG1, MG2 on the basis of a control signal from the HV ECU 70, and, as the case may require, outputs, to the HV ECU 70, data relating to the operating state of the motors MG1, MG2. The motor ECU 40 computes revolutions Nm1, Nm2 of the motors MG1, MG2 on the basis of the signals from the rotation position detection sensors 43, 44.

The battery 50 is managed by an electronic control unit for the battery (hereafter, battery ECU) 52. A signal necessary for management of the battery 50 is inputted to the battery ECU 52. As the case may require, the battery ECU 52 communicates with the HV ECU 70 to output, to the latter, data relating to the state of the battery 50. Herein, signals necessary for management of the battery 50 include, for instance, a voltage across terminals, from a voltage sensor disposed between the terminals of the battery 50, as well as a charge and discharge current, from a current sensor mounted to an output terminal, on the positive electrode side, of the battery 50, and a battery temperature Tb from a temperature sensor 51 mounted to the battery 50. The current sensor and the voltage sensor are not depicted in the figures. In order to manage the battery 50, the battery ECU 52 computes a state of charge (SOC) that is the proportion of the power storage amount that is stored in the battery 50 with respect to the total capacity (power storage capacity), on the basis of the integrated value of charge and discharge current as detected by the current sensor. The battery ECU 52 computes input-output limits Win, Wout, which are the maximum allowable electric power to which the battery 50 may be charged and discharged, on the basis of the SOC and the battery temperature Tb. The input-output limits Win, Wout of the battery 50 can be set by, for instance, setting a base value of the input-output limits Win, Wout on the basis of the battery temperature Tb, setting a correction factor for output limit and a correction factor for input limit on the basis of the SOC of the battery 50, and multiplying the base value of the set input-output limits Win, Wout by the correction factors.

The parking lock mechanism 90 has a parking gear 92 that is mounted to the drive shaft 36, and a parking lock pawl 94 that meshes with the parking gear 92 and that locks the parking gear 92 in a state where rotational driving of the latter is stopped. The HV ECU 70 receives the input of an operation signal of changeover from another position to a parking position (P position) or an operation signal of changeover from the parking position to another position, and operates the parking lock pawl 94, through driving control of an actuator not shown, so that the parking lock pawl 94 meshes with, or disengages from, the parking gear 92, to perform thereby parking lock or parking release.

The HV ECU 70 is configured in the form of a microprocessor centered on a central processing unit (CPU) not shown. The HV ECU 70 has, besides the CPU, a read only memory (ROM) that stores a processing program, a random access memory (RAM) that stores data temporarily, an input-output port and a communication port. To the HV ECU 70 there are inputted, via an input port, for instance: an ignition signal from an ignition switch 80, a shift position SP from a shift position sensor 82 that detects an operation position of a shift lever 81, an accelerator depression amount Acc from an accelerator pedal position sensor 84 that detects a depression amount of an accelerator pedal 83, a brake pedal position BP from a brake pedal position sensor 86 that detects a depression amount of a brake pedal 85, and a vehicle speed V from a vehicle speed sensor 88. The HV ECU 70 outputs, for instance, a driving control signal to an actuator, not shown, of the parking lock mechanism 90. As described above, the HV ECU 70 is connected to the engine ECU 24, the motor ECU 40 and the battery ECU 52 via a communication port, and exchanges various control signals and data with the engine ECU 24, the motor ECU 40 and the battery ECU 52.

In the hybrid automobile 20 of the first embodiment, the shift position SP of the shift lever 81 includes a parking position (P position) used during parking, a reverse position (R position) for reverse travel, a neutral position (N position), and a ordinary drive position (D position) for forward travel, and, in addition, a brake position (B position) the settings and so forth whereof are identical to those of the D position when the accelerator is on, but that is set so that a braking force that acts when the accelerator is off during travel is greater than that at the D position. When in the first embodiment the accelerator is switched off during travel, in the B position the engine 22, having fuel injection in a discontinued state, is motored by the motor MG1; as a result, the engine 22 is caused to rotate forcibly. Herein there are concomitantly used brake control wherein the rotation resistance of the engine 22 acts, as a braking force, on the drive shaft 36, and brake control wherein a braking force acts on the drive shaft 36, through regenerative control of the motor MO2.

The HV ECU 70, the engine ECU 24, the motor ECU 40 and the battery ECU 52 correspond to the control unit of a vehicle of the first embodiment.

In the hybrid automobile 20 of the first embodiment, a request torque to be outputted to the drive shaft 36 is calculated on the basis of the accelerator depression amount Acc corresponding to the depression amount of the accelerator pedal 83 by the driver, and on the basis of the vehicle speed V. The operation of the engine 22, the motor MG1 and motor MG2 is controlled next in such a manner that a request motive power corresponding to the request torque is outputted to the drive shaft 36. Operation control of the engine 22, the motor MG1 and the motor MG2 include, for instance, a torque conversion operation mode, a charge and discharge operation mode and a motor operation mode. In the torque conversion operation mode, the operation of the engine 22 is controlled in such a manner that the engine 22 outputs motive power commensurate with the request motive power, and driving of the motor MG1 and the motor MG2 is controlled in such a manner that all the motive power that is outputted by the engine 22 is converted to torque by the power distribution and integration mechanism 30, the motor MG1 and the motor MG2, and is outputted to the drive shaft 36. In the charge and discharge operation mode, the operation of the engine 22 is controlled in such a manner that the engine 22 outputs motive power commensurate with the sum of the request motive power plus electric power necessary for charge and discharge of the battery 50, and driving of the motor MG1 and the motor MG2 is controlled in such a manner that the entirety or part of the motive power that is outputted by the engine 22 accompanying charge and discharge of the battery 50 is converted to torque by the power distribution and integration mechanism 30, the motor MG1 and the motor MG2, and, in response to thereto, the request motive power is outputted to the drive shaft 36. The motor operation mode may be, for instance, a motor operation mode wherein operation control is performed in such a manner that motive power commensurate with the request motive power from the motor MG2 upon shutdown of the operation of the engine 22 is outputted to the drive shaft 36. The torque conversion operation mode and the charge and discharge operation mode are modes wherein the engine 22 and the motors MG1, MG2 are controlled in such a manner that the request motive power accompanying the operation of the engine 22 is outputted to the drive shaft 36. Therefore, the two modes may conceivably be combined to yield an engine operation mode.

In the hybrid automobile 20 of the first embodiment, the operation of the engine 22 is discontinued and the mode changes over to the motor operation mode, when a request power Pe* of the engine 22 becomes equal to or smaller than a threshold value Pstop, during operation in the engine operation mode. The threshold value Pstop is established such that the operation of the engine 22 should be discontinued in order to operate the engine 22 with good efficiency. The engine 22 is started up and the mode switches to the engine operation mode when the request power Pe* of the engine 22 becomes equal to or greater than a threshold value Pstart, during operation in the motor operation mode. The threshold value Pstart is established such that the engine 22 should be started up in order to operate the engine 22 with good efficiency. The request power Pe* of the engine 22 is obtained by subtracting a charge and discharge request power Pb* of the battery 50 from a power for travel Pdrv* that is obtained by multiplying a request torque Tr* by the revolutions Nr of the drive shaft 36. When in the hybrid automobile 20 of the first embodiment the shift position SP is the parking position (P position), the engine 22 is started up when the SOC of the battery 50, while the operation of the engine 22 is discontinued, is equal to or smaller than a threshold value Slo (for instance, 35%, 40% or the like) as an SOC for charging start; until the SOC of the battery 50 becomes equal to or greater than a threshold value Shi (for instance, 60%, 65% or the like), as the SOC upon charging completion, electric power is generated, by the motor MG1, using motive power from the engine 22, and the battery 50 is charged as a result. Herein, torque acts on the drive shaft 36 via the power distribution and integration mechanism 30. In consequence, when the drive shaft 36 is not locked by the parking lock mechanism 90, the motor MG2 outputs torque that is the sum of cancel torque that cancels the torque acting on the drive shaft 36 plus backlash torque for backlashing of a gear mechanism or the like, not shown. The motor MG2 outputs no torque when the drive shaft 36 is locked by the parking lock mechanism 90.

Figure 2:
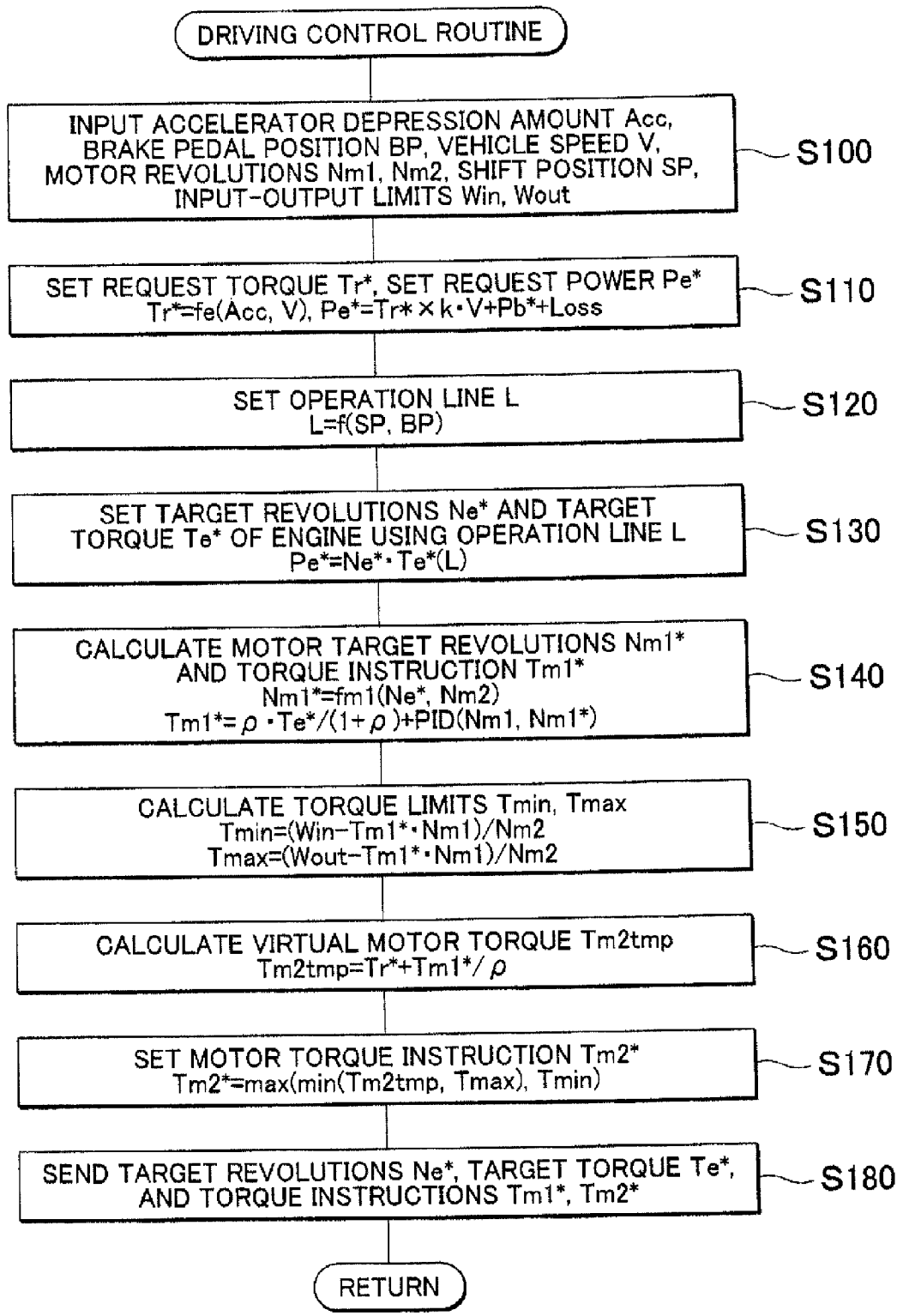
FIG. 2 is a flowchart illustrating an example of a driving control routine that is executed by an electronic control unit for a hybrid vehicle (HV ECU) 70 of the first embodiment.

An explanation follows next on the operation of the hybrid automobile 20 of the first embodiment configured as described above, and in particular on the operation when the engine 22 is running at comparatively low revolutions and high torque. FIG. 2 is a flowchart illustrating an example of a driving control routine that is executed by the HV ECU 70. This routine is repeatedly executed every predetermined time (for instance, every several milliseconds).

When the driving control routine is executed, a CPU 72 of the HV ECU 70 executes firstly a process of inputting data that is necessary for control, for instance, the accelerator depression amount Ace from the accelerator pedal position sensor 84, the vehicle speed V from the vehicle speed sensor 88, the brake pedal position BP from the brake pedal position sensor 86, the shift position SP from the shift position sensor 82, the revolutions Nm1, Nm2 of the motors MG1, MG2, and the input-output limits Win, Wout of the battery 50 (step S100). As the revolutions Nm1, Nm2 of the motors MG1, MG2 there are set the revolutions calculated on the basis of the rotation position of the rotors of the motors MG1, MG2 as detected by the rotation position detection sensors 43, 44, the calculated revolutions being inputted by the motor ECU 40 to the HV ECU 70, through communication therebetween. The input-output limits Win, Wout are the limits that are set on the basis of the battery temperature Tb of the battery 50 as detected by the temperature sensor 51 and on the SOC of the battery 50, the set limits being inputted by the battery ECU 52 to the HV ECU 70, through communication therebetween.

Upon input of such data, there are set a request torque Tr* to be outputted to the drive shaft 36 that is coupled to the drive wheels 63a, 63b, as the torque that is requested for the vehicle, and the request power Pe* that is requested for the engine 22, on the basis of the inputted accelerator depression amount Acc and vehicle speed V (step S110). As regards the request torque Tr*, in the first embodiment, a relationship between the accelerator depression amount Acc, the vehicle speed V and the request torque Tr* is stored in a ROM, not shown, of the HV ECU 70, as a map for request torque setting, such that when the accelerator depression amount Ace and the vehicle speed V are given, a corresponding request torque Tr* is derived from the stored map, and is set as the request torque Tr*. FIG. 3 illustrates an example of the map for request torque setting. The request power Pe* can be calculated as the sum of the result of multiplying the set request torque Tr* by the revolutions Nr of the drive shaft 36, plus a loss Loss and the charge and discharge request power Pb* that is requested by the battery 50. The revolutions Nr of the drive shaft 36 can be worked out by multiplying the vehicle speed V by a conversion factor k, or can be worked out as the revolutions Nm2 of the motor MG2.

Figure 5:
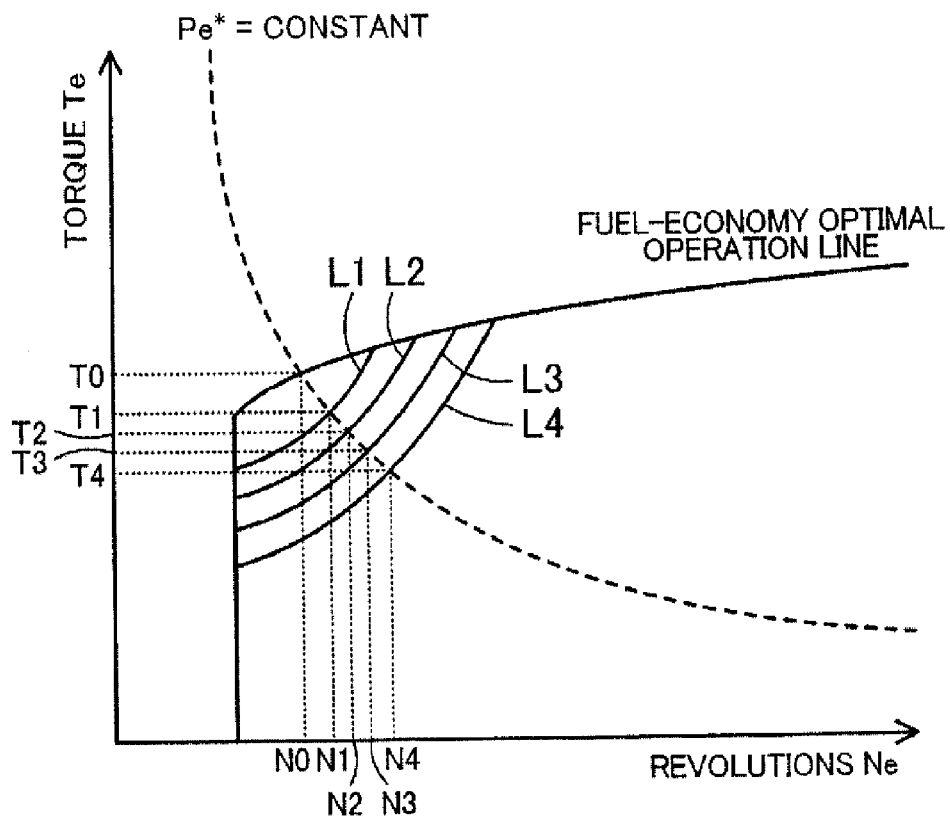
FIG. 5 is an explanatory diagram illustrating an example of a fuel-economy optimal operation line, operation lines L1 to L4, and an operation point of an engine 22.
Figure 6:
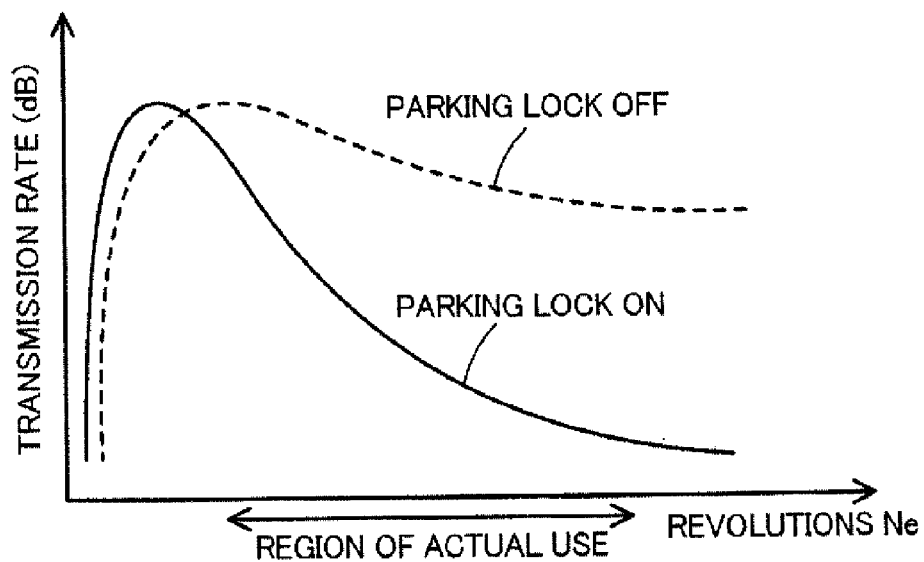
FIG. 6 is an explanatory diagram illustrating an example of the relationship between an on or off state of a parking lock by a parking lock mechanism 90, revolutions Ne of the engine 22, and the transmission rate at which abnormal noise, such as a muffled sound or a rattling noise, is transmitted, via a vehicle body and so forth, to the driver.

Next, there is set an operation line L for setting a target operation point (target revolutions Ne* and target torque Te*) of the engine 22, on the basis of the inputted shift position SP and brake pedal position BP (step S120); and there is set a target operation point (target revolutions Ne* and target torque Te*) of the engine 22, using the set operation line L (step S130). FIG. 4 illustrates an example of the relationship between the shift position SP, the brake pedal position BP, and operation lines L. FIG. 5 illustrates an example of the relationship between a fuel-economy optimal operation line, operation lines L1 to L4 and the operation point (revolutions, torque) of the engine 22. The fuel-economy optimal operation line of FIG. 5 is established beforehand, as an operation line in which the fuel economy of the engine 22 is optimal, and can be worked out, for instance, through experimentation based on the characteristics of the engine 22. The operation lines L1 to L4 are such that, in a comparatively low-rpm, high-torque region (abnormal noise generation region at which an abnormal noise such as a muffled sound or a rattling noise occurs) the lines differ from the fuel-economy optimal operation line, and avoid stepwise the abnormal noise generation region, from the fuel-economy optimal operation line, in the order L1, L2, L3, L4. The "avoidance degree" that appears rightmost in FIG. 4 denotes the degree to which the abnormal noise generation region is avoided from the fuel-economy optimal operation line. The degree of avoidance is smaller at the P position, from among the P position and D position of the shift position SP; also, the degree of avoidance is smaller for brake on, from among brake on and brake off. FIG. 6 illustrates an example of the relationship between the on-off state of the parking lock by the parking lock mechanism 90, the revolutions Ne of the engine 22, and a transmission rate (dB) at which abnormal noise, such as a muffled sound or a rattling noise, is transmitted to the driver via the vehicle body and the like. At the region of actual use of the engine 22, the transmission rate is smaller when the parking lock is on than when the parking lock is off, as shown in the figure. Therefore, abnormal noise, such as a muffled sound or a rattling noise, is less likely to be transmitted to the driver when the parking lock is on than when the parking lock is off. Accordingly, the degree of avoidance of the abnormal noise generation region from the fuel-economy optimal operation line may be set to be smaller when the parking lock is on than when the parking lock is off. Although not shown in the figure, the magnitude of the transmission rate, to the driver, of an abnormal noise, such as a muffled sound or a rattling noise, varies also depending on whether or not the driver is stepping on the brake pedal 85 (i.e. depending on brake on-off). However, the same relationship holds herein as for the transmission rate depending on the parking lock being on or off. The magnitude relationship of the "avoidance degree" at the P position and the D position in FIG. 4 is determined by whether the parking lock is on or off, and whether the brake is on or off. These relationships can be regarded as the degree to which the travel of the vehicle is restricted, i.e. the degree to which the travel of the vehicle is hindered. The degree to which parking lock on-off hinders the travel of the vehicle is higher when the parking lock is on than when the parking lock is off. The degree to which brake on-off hinders the travel of the vehicle is higher when the brake is on than when the brake is off. Therefore, it can be concluded that the greater the degree to which the travel of the vehicle is restricted, the smaller becomes the degree to which the abnormal noise generation region is avoided from the fuel-economy optimal operation line. In the first embodiment, the operation lines (fuel-economy optimal operation line, operation lines L1 to L4) are established beforehand, for instance, experimentally, and are stored in the ROM, not shown, of the HV ECU 70, such that the operation line L is set through derivation of a corresponding operation line when the shift position SP and the brake pedal position BP are given. As illustrated in FIG. 5, the target operation point (target revolutions Ne* and target torque Te*) of the engine 22 can be worked out in the form of the torque and revolutions at the intersection between the operation line L and a curve along which the request power Pe* is constant (broken line in FIG. 5). For instance, when the fuel-economy optimal operation line is set as the operation line L, revolutions N0 and torque T0 at the intersection between the request power Pe* and the fuel-economy optimal operation line are set as the target revolutions Ne* and the target torque Te*. When any one from among an operation line L1 (brake on at the P position), an operation line L2 (brake off at the P position), an operation line L3 (brake on at the D position) and an operation line L4 (brake off at the D position) is set as the operation line L, the revolutions (corresponding value from among N1 to N4) and torque (corresponding value from among T1 to T4) at the intersection between the request power Pe* and the set operation line L are set as the target revolutions Ne* and the target torque Te*.

Next, target revolutions Nm1* of the motor MG1 are calculated, on the basis of Expression (1) below, using the set target revolutions Ne*, the revolutions Nr (Nm2/Gr) of the drive shaft 36 and a gear ratio ρ of the power distribution and integration mechanism 30, and a torque instruction Tm1* of the motor MG1 is calculated, using Expression (2), on the basis of the calculated target revolutions Nm1* and current revolutions Nm1 (step S140). Herein, Expression (1) is a mechanical relationship expression of the power distribution and integration mechanism 30 with respect to rotational elements. Further, Expression (2) is a relationship expression of feedback control for causing the motor MG1 to rotate at the target revolutions Nm1*. In Expression (2), "k1" in the second right-hand term is a proportional gain, and "k2" in the third right-hand term is an integral gain.

$$Nm1^* = Ne^* \cdot (1+\rho)/\rho - Nm2/\rho \qquad \text{Expression (1)}$$

$$Tm1^* = \rho - Te^*/(1+\rho) + k1(Nm1^* - Nm1) + k2\!\int\!(Nm1^* - Nm1)dt \qquad \text{Expression (2)}$$

Upon calculation of the target revolutions Nm1* and torque instruction Tm1* of the motor MG1, torque limits Tmin, Tmax are calculated, based on Expression (3) and Expression (4) below, as upper and lower limits of torque that may be outputted by the motor MG2, through division, by the revolutions Nm2 of the motor MG2, of a deviation between a consumed electric power (generated power) of the motor MG1 that is obtained by multiplying the input-output limits Win, Wout of the battery 50 and the calculated torque instruction Tm1* of the motor MG1, by the current revolutions Nm1 of the motor MG1 (step S150). A virtual motor torque Tm2tmp is calculated, on the basis of Expression (5), as the torque to be outputted by the motor MG2, using the request torque Tr*, the torque instruction Tm1* and the gear ratio σ of the power distribution and integration mechanism 30 (step S160), and a torque instruction Tm2* of the motor MG2 is set as the value to which the virtual motor torque Tm2tmp is limited by the calculated torque limits Tmin, Tmax (step S170). Setting thus the torque instruction Tm2* of the motor MG2 allows setting the request torque Tr* to be outputted by the drive shaft 36 as the torque that is limited to the range within the input-output limits Win, Wout of the battery 50.

$$Tmin = (Win - Tm1^* \cdot Nm1)/Nm2 \qquad \text{Expression (3)}$$

$$Tmax = (Wout - Tm1^* \cdot Nm1)/Nm2 \qquad \text{Expression (4)}$$

$$Tm2tmp = Tr^* + Tm1^*/\sigma \qquad \text{Expression (5)}$$

Upon setting of the target revolutions Ne* and target torque Te* of the engine 22 and the torque instructions Tm1*, Tm2* of the motors MG1, MG2, the target revolutions Ne* and the target torque Te* of the engine 22 are sent to the engine ECU 24, and the torque instructions Tm1*, Tm2* of the motors MG1, MG2 are sent to the motor ECU 40 (step S180), and the driving control routine is terminated. The engine ECU 24, having received the target revolutions Ne* and the target torque Te*, performs controls, for instance fuel injection control and ignition control, on the engine 22 in such a manner that the engine 22 is operated at the operation point that is denoted by the target revolutions Ne* and the target torque Te*. The motor ECU 40, having received the torque instructions Tm1*, Tm2*, performs switching control of switching elements of the inverters 41, 42 in such a manner that the motor MG1 is driven according to the torque instruction Tm1* and motor MG2 is driven according to the torque instruction Tm2*.

In the hybrid automobile 20 equipped with the control unit of a vehicle of the first embodiment described above, a plurality of operation lines L1 to L4, such that the greater the degree to which the travel of the vehicle is restricted, the smaller becomes the degree to which the abnormal noise generation region is avoided from the fuel-economy optimal operation line is stored in a ROM, not shown, of the HV ECU 70, associated to the fuel-economy optimal operation line as well as to the shift position SP and the brake pedal position BP. The HV ECU 70 sets, as the operation line L, a corresponding operation line on the basis of the shift position SP and the brake pedal position BP, and sets the target operation point (target revolutions Ne* and target torque Te*) of the engine 22 using the set operation line L. The engine 22 and the motors MG1, MG2 are controlled in such a manner that the engine 22 is operated at the target operation point, and the request torque Tr* is outputted to the drive shaft 36. In the hybrid automobile 20, as a result, the engine 22 can be operated by selecting the degree of avoidance of the abnormal noise generation region from the fuel-economy optimal operation line in accordance with the degree to which the travel of the vehicle is restricted. As a result, it becomes possible to suppress discomfort to the driver caused by abnormal noise, such as a muffled sound or a rattling noise, and it becomes possible to improve the fuel economy of the vehicle.

In the hybrid automobile 20 of the first embodiment there is considered the degree of avoidance of an abnormal noise generation region from the fuel-economy optimal operation line depending on brake on-off, but the degree of avoidance of an abnormal noise generation region from the fuel-economy optimal operation line depending on brake on-off may be ignored. In such a case, for instance, an operation line of brake off at a position corresponding to the shift position SP in FIG. 4 may be used as the setting of the operation line L. In the setting of the operation line L, the operation line L2 may be set in this case when the shift position SP is at the P position, and the operation line L4 may be set when the shift position SP is at the D position.

In the hybrid automobile 20 of the first embodiment there is considered the degree of avoidance of an abnormal noise generation region from the fuel-economy optimal operation line depending on parking lock on-off, but the degree of avoidance of an abnormal noise generation region from the fuel-economy optimal operation line depending on parking lock on-off may be ignored. In such a case, there may be used, for instance, an operation line of a time when the shift position SP is at the D position in FIG. 4, as the setting of the operation line L. Specifically, the operation line L3 may be set when the brake is on, and the operation line L4 may be set when the brake is off.

Figure 7:
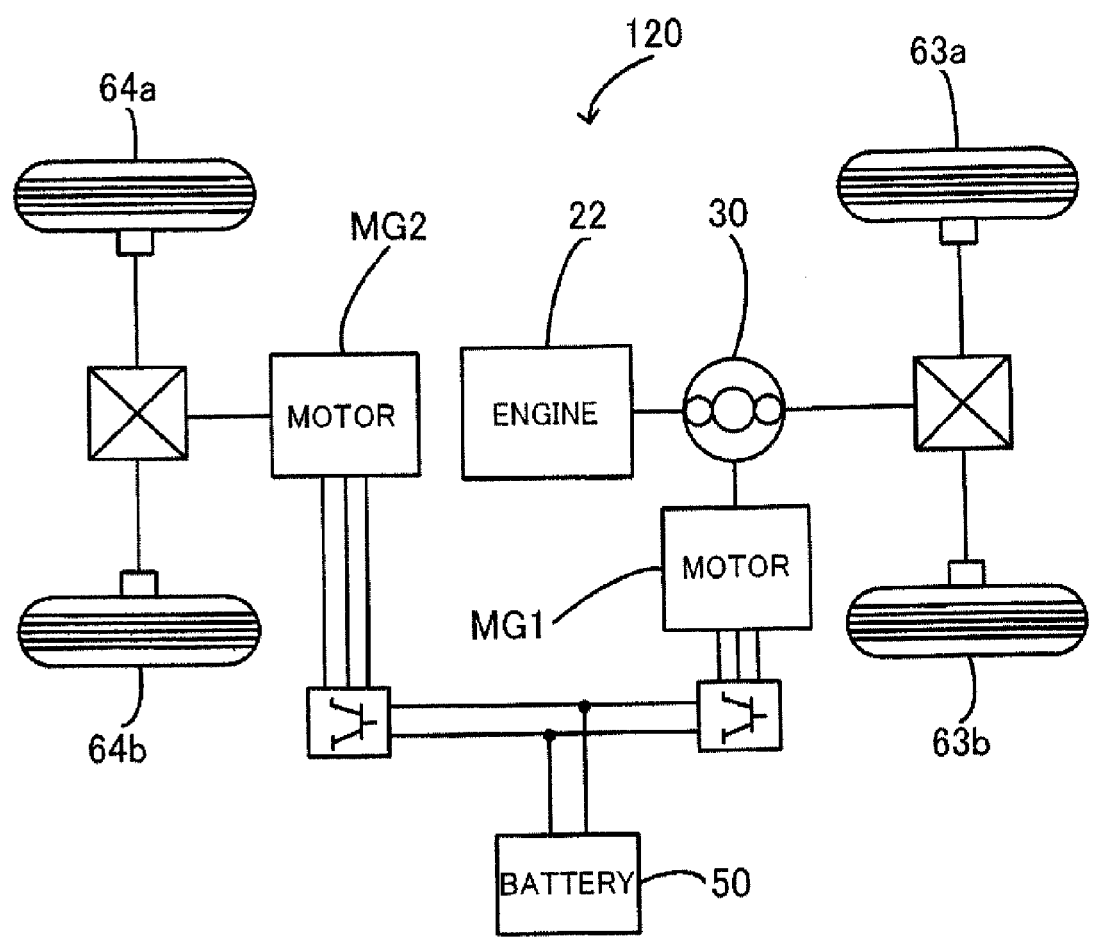
FIG. 7 is a configuration diagram illustrating schematically the configuration of a hybrid automobile 120 in a variation.

In the hybrid automobile 20 of the first embodiment, the motive power of the motor MG2 is outputted to the drive shaft 36, but the motive power of the motor MG2 may be connected to an axle (axle connected to wheels 64a, 64b in FIG. 7) that is different from the axle to which the drive shaft 36 is connected (axle to which the drive wheels 63a, 63b are connected), as in an example of a hybrid automobile 120 in a variation of FIG. 7.

Figure 8:
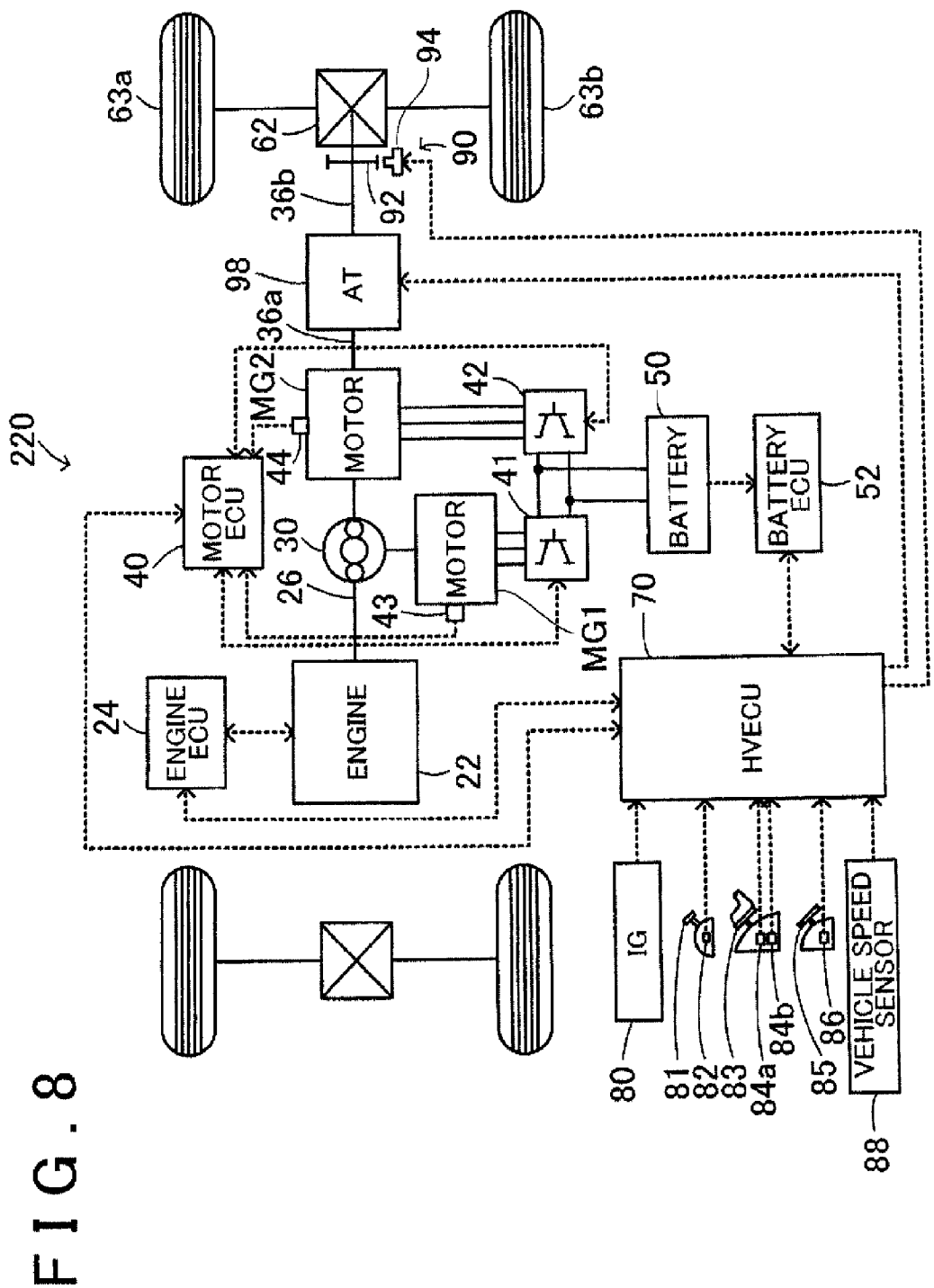
FIG. 8 is a configuration diagram illustrating schematically the configuration of a hybrid automobile 220 that is equipped with a control device of a vehicle of a second embodiment.

An explanation follows next on a hybrid automobile 220 that is equipped with a control device of a vehicle of a second embodiment of the invention. FIG. 8 is a configuration diagram illustrating schematically the configuration of the hybrid automobile 220 of the second embodiment. As the figure illustrates, the hardware configuration of the hybrid automobile 220 of the second embodiment is identical to the hardware configuration of the hybrid automobile 20 of the first embodiment illustrated in FIG. 1, except that now an automatic transmission 98 is mounted further to the rear than the position at which the motor MG2 of the drive shaft 36 is mounted. Therefore, in order to avoid recurrent explanations, features in the hardware configuration of the hybrid automobile 220 of the second embodiment that are identical to those of the hardware configuration of the hybrid automobile 20 of the first embodiment are denoted by identical reference numerals, and an explanation thereof will be omitted.

The automatic transmission 98 of the hybrid automobile 220 of the second embodiment is connected to an input shaft 36a, to which there are connected the ring gear of the power distribution and integration mechanism 30 and the rotor of the motor MG2, and to an output shaft 36b that is connected to the drive wheels 63a, 63b, via the differential gear 62. The automatic transmission 98 is configured in the form of a conventional hydraulically-driven four-speed automatic transmission in which there is selected any one from among neutral and first to fourth speeds. The automatic transmission 98 is controlled by the HV ECU 70 in such a manner that the shift position SP changes to neutral when at the N position or the P position; when the shift position SP is at the D position, the automatic transmission 98 is controlled through upshifting or downshifting to any from among a corresponding first to fourth speed on the basis of a conventional shift line (three upshift lines and three downshift lines) according to the accelerator depression amount Acc and the vehicle speed V.

Figure 9:
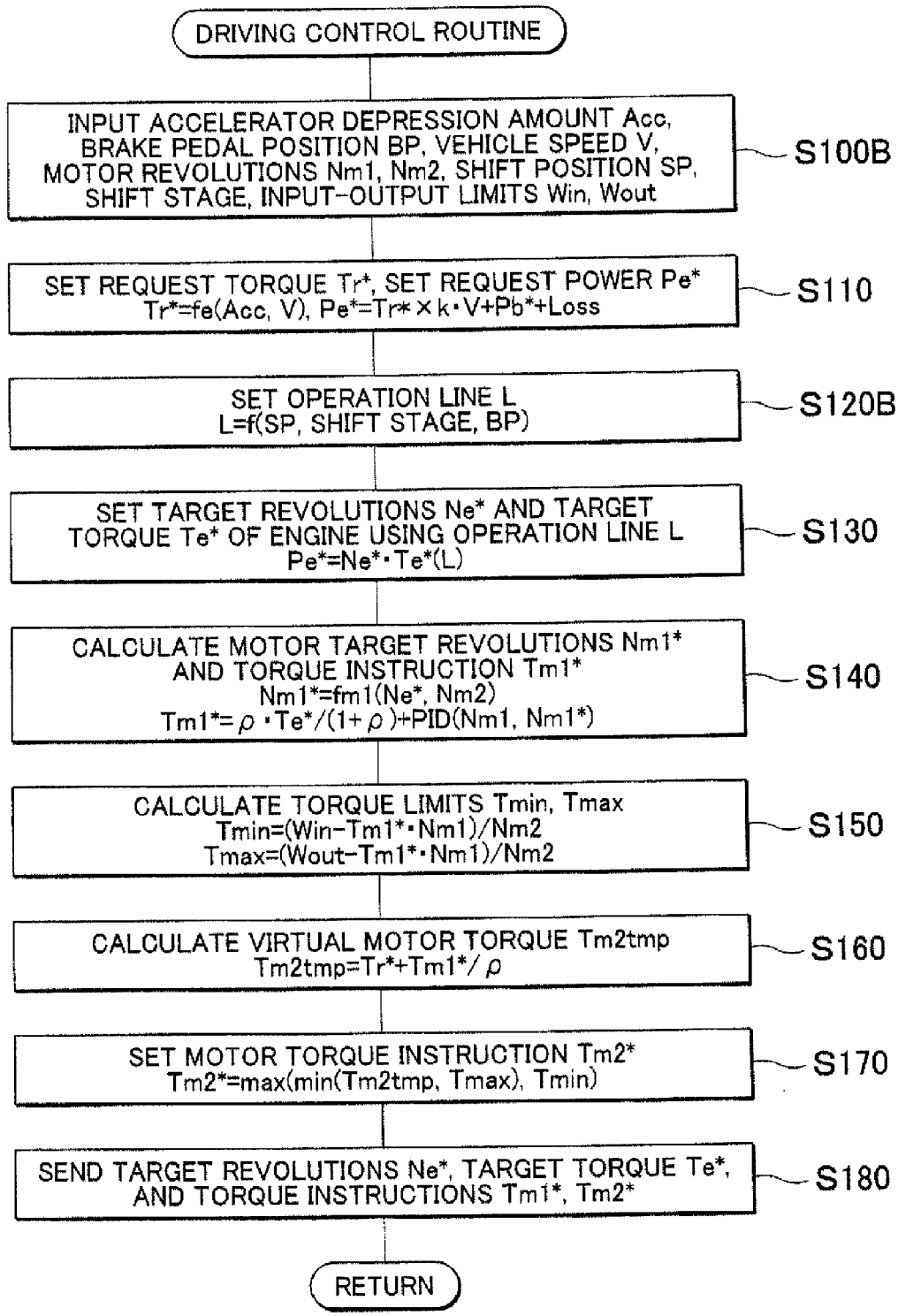
FIG. 9 is a flowchart illustrating an example of a driving control routine that is executed by the HV ECU 70 of the second embodiment.

In the hybrid automobile 220 of the second embodiment the driving control routine of FIG. 9 is executed instead of the driving control routine of FIG. 2. The driving control routine of FIG. 9 is identical to the driving control routine of FIG. 2, except for a step wherein a shift stage of the automatic transmission 98 is inputted in addition to, for instance, the accelerator depression amount Acc and the brake pedal position BP, in a data input process (step S100B), and when the shift position SP is at the D position, an operation line L is set on the basis of the shift stage of the automatic transmission 98 and the brake pedal position BP (step S120B). As the request torque Tr* it is sufficient to use the torque requested for the output shaft 36b instead of the drive shaft 36. In the calculation of the request power Pe*, it is sufficient to use the revolutions of the output shaft 36b instead of the revolutions Nr of the drive shaft 36, and it is sufficient to use the revolutions Nm2 of the motor MG2 when using the revolutions Nr of the drive shaft 36 in the calculation of the torque instructions Tm1*, Tm2* of the motors MG1, MG2. In view of the foregoing, the result of multiplying the vehicle speed V by the conversion factor k is used as the revolutions Nr of the drive shaft 36 in the driving control routine of the FIG. 2 described above. The revolutions Nm2 of the motor MG2 are used, but not the revolutions Nr of the drive shaft 36, in the calculation of the torque instructions Tm1*, Tm2* of the motors MG1, MG2. Therefore, the driving control routine of FIG. 2 described above can be used also as the driving control routine of the hybrid automobile 220 of the second embodiment equipped with the automatic transmission 98.

In the driving control routine executed by the HV ECU 70 of the hybrid automobile 220 of the second embodiment, there is inputted various data including the shift stage of the automatic transmission 98 (step S100B); there is set the request torque Tr* requested for the output shaft 36b, on the basis of the accelerator depression amount Acc and the vehicle speed V, using the request torque setting map of FIG. 3, and there is set the request power Pe* requested for the engine 22 (step S110); and there is set the operation line L for setting the target operation point (target revolutions Ne* and target torque Te*) of the engine 22, on the basis of the shift position SP, the shift stage of the automatic transmission 98 and the brake pedal position BP (step S120B). FIG. 10 illustrates an example of the relationship between the shift position SP, the shift stage of the automatic transmission 98, the brake pedal position BP and operation lines L. As in FIG. 4, the "avoidance degree" depicted rightmost in FIG. 10 denotes the degree to which the abnormal noise generation region is avoided from the fuel-economy optimal operation line. The degree of avoidance is smaller at the P position, from among the P position and D position of the shift position SP. Regarding the "avoidance degree", the degree of avoidance is smaller for brake on, from among brake on and brake off. When the shift position SP is at the D position, the degree of avoidance becomes smaller the further the shift stage is on the low vehicle speed range (first speed being the lowest vehicle speed stage), as compared with the shift stage on the high vehicle speed range (sixth speed being the highest speed stage). In the second embodiment, the transmission rate, to the driver, of an abnormal noise, such as a muffled sound or a rattling noise, becomes smaller the further the shift stage is on the low vehicle speed range. Therefore, the magnitude relationship of the "avoidance degree" at the D position in FIG. 10 is determined by the shift stage and by whether the brake is on or off. These relationships can be regarded as the degree to which the travel of the vehicle is restricted, i.e. the degree to which the travel of the vehicle is hindered, or the degree of unsuitability for travel at a high vehicle speed. The degree to which parking lock on-off hinders the travel of the vehicle is higher when the parking lock is on than when the parking lock is off. The degree to which brake on-off hinders the travel of the vehicle is higher when the brake is on than when the brake is off. At the D position, the further the shift stage is on the low vehicle speed range, the higher becomes the degree of unsuitability for travel at high vehicle speed, as compared with a shift stage on the high vehicle speed range. Therefore, it can be concluded that the greater the degree to which the travel of the vehicle is restricted, the smaller becomes the degree to which the abnormal noise generation region is avoided from the fuel-economy optimal operation line. In the second embodiment, the operation lines (fuel-economy optimal operation line, operation lines LP1, LP2 and LD1 to LD8) are established beforehand, for instance, experimentally, and are stored in the ROM, not shown, of the HV ECU 70, such that the operation line L is set through derivation of a corresponding operation line when the shift position SP, the shift stage of the automatic transmission 98, and the brake pedal position BP are given.

Upon setting of the operation line L as described above, the target operation point (target revolutions Ne* and target torque Te*) of the engine 22 are set using this operation line (step S130), the torque instructions Tm1\*, Tm2\* of the motors MG1, MG2 are set taking the input shaft 36a as the drive shaft 36 (steps S140 to S170), the target revolutions Ne* and target torque Te* of the engine 22 are sent to the engine ECU 24, and the torque instructions Tm1\*, Tm2\* of the motors MG1, MG2 are sent to the motor ECU 40 (step S180), and the driving control routine is terminated.

In the hybrid automobile 220 of the second embodiment described above, a plurality of operation lines LP1, LP2 and LD1 to LD8, such that the greater the degree to which travel of the vehicle is hindered and/or the greater the degree to which travel of the vehicle is restricted, as the degree of unsuitability for travel at a high vehicle speed, the smaller becomes the degree of avoidance of the abnormal noise generation region from the fuel-economy optimal operation line, is associated with the fuel-economy optimal operation line, as well as with the shift position SP, the shift stage of the automatic transmission 98 and the brake pedal position BP, and the lines are stored in a ROM, not shown, of the HV ECU 70; a corresponding operation line is set, as the operation line L, on the basis of the shift position SP, the shift stage of the automatic transmission 98 and the brake pedal position BP; the target operation point (target revolutions Ne* and target torque Te*) of the engine 22 is set using the set operation line L; and the engine 22, the motors MG1, MG2 and the automatic transmission 98 are controlled in such a manner that the engine 22 operates at the target operation point and in such a manner that the request torque Tr* is outputted to the output shaft 36b. As a result, the engine 22 can be operated by selecting the degree of avoidance of the abnormal noise generation region from the fuel-economy optimal operation line in accordance with the degree to which the travel of the vehicle is restricted. As a result, it becomes possible to suppress discomfort to the driver caused by abnormal noise, such as a muffled sound or a rattling noise, and it becomes possible to improve the fuel economy of the vehicle.

In the hybrid automobile 220 of the second embodiment a four-speed automatic transmission is used as the automobile 220, but the shift stages of the automatic transmission 98 may be any shift stages. That is, the automatic transmission 98 may be a two-speed or three-speed automatic transmission, or a five-speed or six-speed, or seven-speed or higher automatic transmission 98. Moreover, the embodiment is not limited to a stepped automatic transmission, and may be used also in a continuously variable transmission.

An explanation follows next on a correspondence between the main elements of the embodiments and the main elements of the invention set forth in the section relating to the means for solving the problems. In the first embodiment and the second embodiment, the engine 22 functions as an "internal combustion engine", the motor MG1 functions as a "power generator", the power distribution and integration mechanism 30 functions as a "planetary gear mechanism", the motor MG2 functions as an "electric motor", the HV ECU 70 that executes the driving control routine of FIG. 2 and the driving control routine of FIG. 9, the engine ECU 24 that controls the engine 22 through reception of the target revolutions Ne* and the target torque Te*, the motor ECU 40 that performs driving control of the motors MG1, MG2 through reception of the torque instructions Tm1\*, Tm2\*, and the battery ECU 52 that manages the battery 50 function all as the "control unit".

Herein, the "internal combustion engine" is not limited to the engine 22 that is configured in the form of an internal combustion engine that outputs motive power from a hydrocarbon-based fuel, for instance gasoline or diesel oil, and may be an internal combustion engine of any type, for instance a hydrogen engine. The "power generator" is not limited to the motor MG1 that is configured in the form of a synchronous generator-motor, and may be a power generator of any type, for instance an induction generator-motor or the like. The "electric motor" is not limited to the motor MG2 that is configured in the form of a synchronous generator-motor, and may be an electric motor of any type, for instance an induction generator-motor or the like. The "planetary gear mechanism" is not limited to the above-described power distribution and integration mechanism 30, and may be any mechanism, for instance a mechanism that relies on a double pinion-type planetary gear mechanism or a combination of a plurality of planetary gear mechanisms connected to four or more shafts, so long as three rotational elements are connected to three shafts, namely the drive shaft that is coupled to an axle, the output shaft of the internal combustion engine, and the rotating shaft of the power generator. The "control unit" is not limited to a control unit that is made up of four electronic control units, namely the HV ECU 70, the engine ECU 24, the motor ECU 40 and the battery ECU 52, and may be a control unit configured in the form of a single electronic control unit, or configured out of two or three electronic control units, or out of five or more electronic control units. The "control unit" is not limited to a control unit that executes the driving control routine of FIG. 2, of setting an operation line L on the basis of parking lock on-off and brake on-off, or the driving control routine of FIG. 9, of setting an operation line L on the basis of parking lock on-off, brake on-off, and, in addition, the shift stage of the automatic transmission 98.

The "control unit" may carry out any process so long as there is set, as an operation line L, an operation line in which the greater the degree to which the travel of the vehicle is restricted, the smaller the degree of avoidance tends to become, from among a plurality of operation lines that are obtained through stepwise avoidance of an abnormal noise generation region, at which an abnormal noise is generated, from a fuel-economy optimal operation line that is established beforehand as an operation line in which the fuel economy of the internal combustion engine is optimal, for instance a process wherein the operation line L is set on the basis of parking lock on-off alone, or wherein the operation line L is set on the basis of brake on-off alone.

Modes for carrying out the invention have been explained above based on embodiments, but the invention is not limited to in any way to the above-described embodiments, and needless to say, may be embodied in various ways without departing from the gist of the invention.

The invention can be used, for instance, in the manufacturing industry of control devices of hybrid vehicles.

What is claimed is:

1. A control device of a hybrid vehicle, comprising:
   an internal combustion engine;
   a power generator capable of input and output of motive power;
   a planetary gear mechanism in which three rotational elements are connected to three shafts, namely a drive shaft that is coupled to an axle, an output shaft of the internal combustion engine, and a rotating shaft of the power generator;
   an electric motor that inputs and outputs motive power to/from the drive shaft; and
   a control unit having a preset map stored therein, the preset map correlating revolutions and torque of the internal combustion engine, the preset map having a curve corresponding to a requested power required from the internal combustion engine, a predetermined fuel-economy optimal operation line, an abnormal noise generation region, and a plurality of operation lines,
   the curve corresponding to the requested power is based on the revolutions and the torque,
   the predetermined fuel-economy optimal operation line is a line correlating revolutions and the torque of the engine in which fuel economy of the internal combustion engine is optimal,
   the abnormal noise generation region is a region of the preset map in which an abnormal noise is generated,
   the plurality of operation lines are obtained by deviating, in a stepwise manner, from the fuel-economy optimal operation line in the abnormal noise generation region,
   the control unit that operates the internal combustion engine using target revolutions and target torque of the internal combustion engine determined on the basis of an intersection between the curve corresponding to the requested power and any of the plurality of operation lines, one of the plurality of operation lines is selected based on a degree to which travel of the vehicle is restricted such that as the degree to which travel of the vehicle is restricted increases a degree of avoidance of the operation line from the fuel-economy optimal operation line decreases.

2. The control device of a hybrid vehicle according to claim 1, wherein
   the control unit performs control using an operation line in which the degree of avoidance from the fuel-economy optimal operation line in the abnormal noise generation region is smaller when a parking lock is on than when the parking lock is off.

3. The control device of a hybrid vehicle according to claim 1, wherein
   the control unit performs control using an operation line in which the degree of avoidance from the fuel-economy optimal operation line in the abnormal noise generation region is smaller when a brake is on than when the brake is off.

4. The control device of a hybrid vehicle according to claim 1, wherein
   the control unit performs control using an operation line in which the degree of avoidance from the fuel-economy optimal operation line in the abnormal noise generation region is smaller at a shift position for a low vehicle speed range than at a shift position for a high vehicle speed range.

5. The control device of a hybrid vehicle according to claim 1, wherein
   the control unit controls the internal combustion engine using, from among the plurality of operation lines, an operation line in which the revolutions of the internal combustion engine become lower and the torque of the internal combustion engine becomes higher at the intersection between the curve corresponding to the request power and each of the plurality of operation lines as the degree to which travel of the vehicle is restricted becomes greater.

6. The control device of a hybrid vehicle according to claim 1, wherein the operation line in which the degree of avoidance from the fuel-economy optimal operation line that decreases, from among the plurality of operation lines, is an operation line in which the revolutions of the internal combustion engine become lower and the torque of the internal combustion engine becomes higher at the intersection between the curve corresponding to the request power and each of the plurality of operation lines.

* * * * *